United States Patent [19]

Moo et al.

[11] Patent Number: 5,682,086
[45] Date of Patent: Oct. 28, 1997

[54] DYNAMIC FILTER FOR AN ELECTRONIC BALLAST WITH A PARALLEL-LOAD RESONANT INVERTER

[75] Inventors: Chin-Sien Moo, Kaohsiung; Ying-Chun Chuang, Tainan, both of Taiwan

[73] Assignee: Yin Nan Enterprises Co., Ltd., Kaohsiung Hsien, Taiwan

[21] Appl. No.: 539,602

[22] Filed: Oct. 5, 1995

[51] Int. Cl.[6] ................................. H05B 37/00
[52] U.S. Cl. .................. 315/247; 315/200 R; 315/209 R
[58] Field of Search ......................... 315/247, 243, 315/307, 308, 227 R, 291, 200 R, 205, 206, 209 R

[56] References Cited

U.S. PATENT DOCUMENTS

| | | | |
|---|---|---|---|
| 4,700,112 | 10/1987 | Chang | 315/205 |
| 5,070,276 | 12/1991 | Burgholte et al. | 315/209 R |
| 5,343,122 | 8/1994 | Sugimori et al. | 315/209 R |
| 5,471,118 | 11/1995 | Nilssen | 315/247 |

*Primary Examiner*—Robert Pascal
*Assistant Examiner*—David Vu
*Attorney, Agent, or Firm*—Bacon & Thomas

[57] ABSTRACT

A dynamic filter is interposed between the bridge rectifier and parallel-load resonant inverter of an electronic ballast. The dynamic filter circuit consists of two energy tanks and two energy transfer diodes and achieves power factor correction by performing input current shaping.

1 Claim, 3 Drawing Sheets

5,682,086

DYNAMIC FILTER FOR AN ELECTRONIC BALLAST WITH A PARALLEL-LOAD RESONANT INVERTER

BACKGROUND OF THE INVENTION

This invention concerns a new dynamic filter for an electronic ballast with a parallel-load resonant inverter, particularly to improve the power factor and reduce harmonic distortion at an AC line.

In recent years, high frequency electronic ballasts are increasingly used to drive fluorescent lamps in lighting applications. An electronic ballast, when consuming power from the utility, requires a bridge rectifier circuit with a bulk capacitor for converting the AC voltage to the DC voltage required by the high frequency inverter. Unfortunately, the rectifier circuit draws a high peak input current, which has a notoriously poor power factor and serious harmonic distortion at the AC line source.

Several methods have been employed for improving the power factor and reducing harmonic distortion.

Among these, passive filtering is the most simple one which can improve the power factor to a somewhat acceptable level merely by adding a few inductors and capacitors. However, when a power factor greater than 0.9 is required, this method becomes impracticable owing to the overweight and oversized reactive components. In contrast, an active filter allows for power factor correction with relatively small inductors and capacitors. With sophisticated current shaping techniques, the active filter can achieve a power factor of near unity with very low harmonic distortion. These advantages, however, are at the expense of higher circuit complexity and more switching losses associated with the added active power switches. In an attempt to solve these problems, this invention presents a simple dynamic filter circuit for an electronic ballast with the parallel-load resonant inverter, which employs a commonly used circuit topology for driving multi-fluorescent lamps, and which, by appropriate arrangement of the added reactive devices, achieves satisfactory performance without affecting the operation of the inverter stage.

SUMMARY OF THE INVENTION

A main objective of this invention is to improve power factor and reduce harmonic distotion at the AC inputs of electronic ballasts.

This objective is achieved by is provision of two resonant energy tanks and two energy transfer diodes between the bridge rectifier and the inverter to perform input current shaping. As a result, a sinusoidal input current in phase with the line voltage can be achieved.

DETAILED DESCRIPTION OF THE INVENTION

Figure 1:
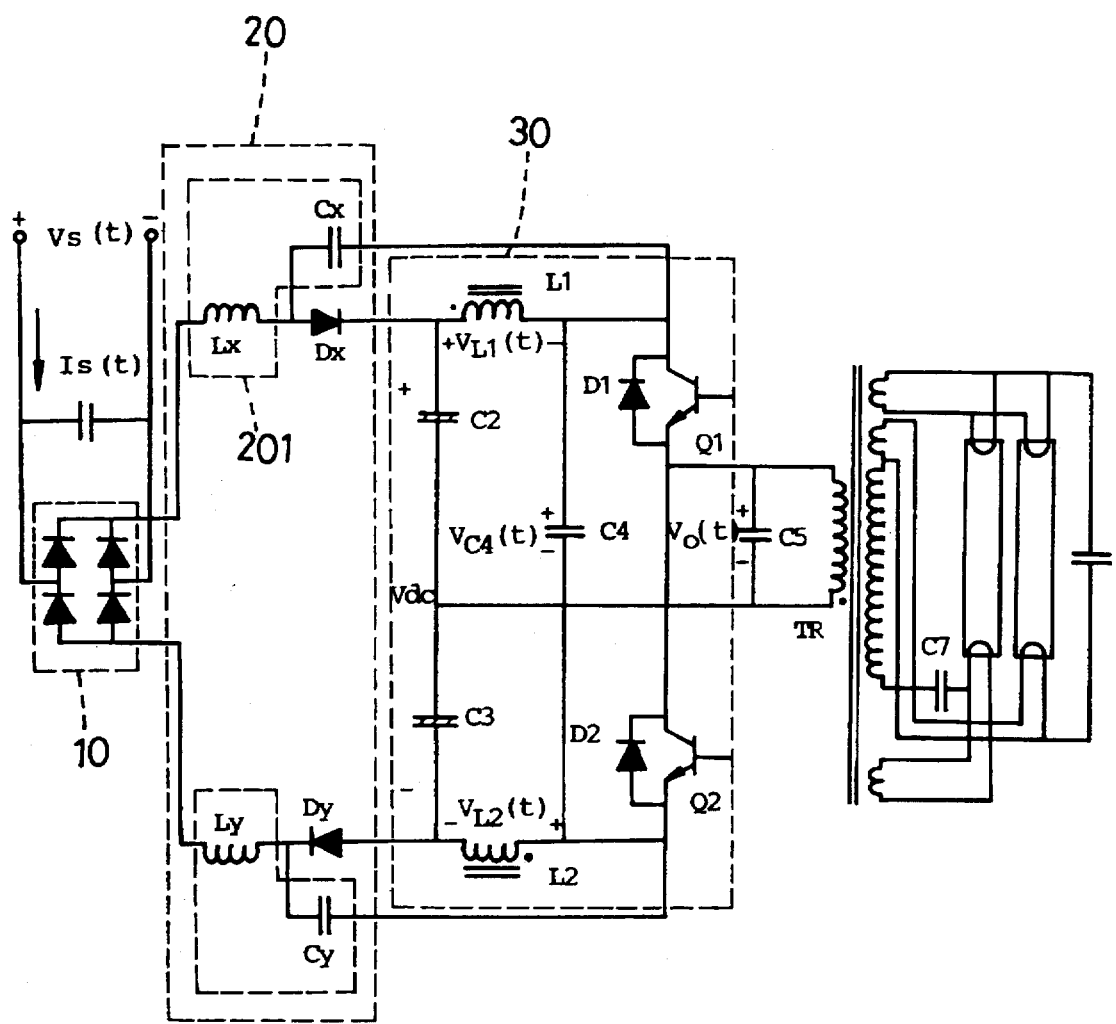
FIG. 1 is a schematic circuit diagram of a parallel-resonant electronic ballast with a new dynamic filter for use in the present invention.

Referring to FIG. 1, the preferred embodiment of the invention includes a dynamic filter circuit 20 added between the bridge rectifier 10 and an inverter 30 of an electronic ballast the filter circuit 20 consists of a pair of resonant energy tanks 201, 202 and two energy transfer diodes Dx, Dy. Each energy tank is made up of an inductor and a capacitor. In this arrangement, the energy transfer diodes switch on and off automatically at the inverter frequency. These two diodes perform soft-switching with zero voltage turn-on and zero current turn-off. As a result, the switching involves virtually no loss. The energy tanks draw currents from the AC line in every switching cycle of the inverter. With additional current paths, the input current becomes a dither waveform with a sinusoidal envelop which is in phase with the AC line voltage. Consequently, a nearly unity power factor can be achieved by removing the high frequency contents with a small passive filter at the input terminal.

Figure 2:
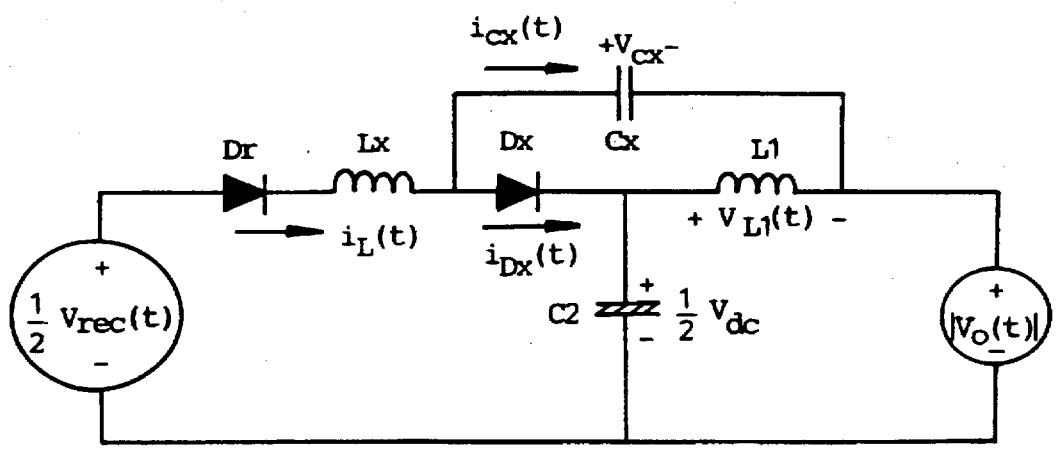
FIG. 2 is a schematic circuit diagram of the filter circuit for use in the present invention.

In accordance with the symmetrical nature of a half-wave bridge type circuit, the upper part of the preferred circuit can be represented by a simplified schematic diagram to facilitate analysis of the high frequency operation of the filter. FIG. 2 shows the simplified circuit. The diode, Dr, represents the bridge rectifier.

Since the two representative diodes, Dr and Dx, turn on and off independently, four topological modes can result as listed in Table 1.

TABLE 1

| Conduction modes of the filter circuit | | | | |
|---|---|---|---|---|
| | Mode 1 | Mode 2 | Mode 3 | Mode 4 |
| Dr | ON | ON | OFF | OFF |
| Dx | OFF | ON | ON | OFF |

Since Dr is off during Modes 3 and 4, the circuit draws current from the AC line only in Modes 1 and 2. Functionally, the current in the inductor increases during Mode 1 and decreases during Mode 2. As a result, the input current dithers around a line frequency sinusoidal wave and its average current follows the input voltage waveform. Removing the high frequency components results in a high power factor and low harmonic distortion.

Figure 4:
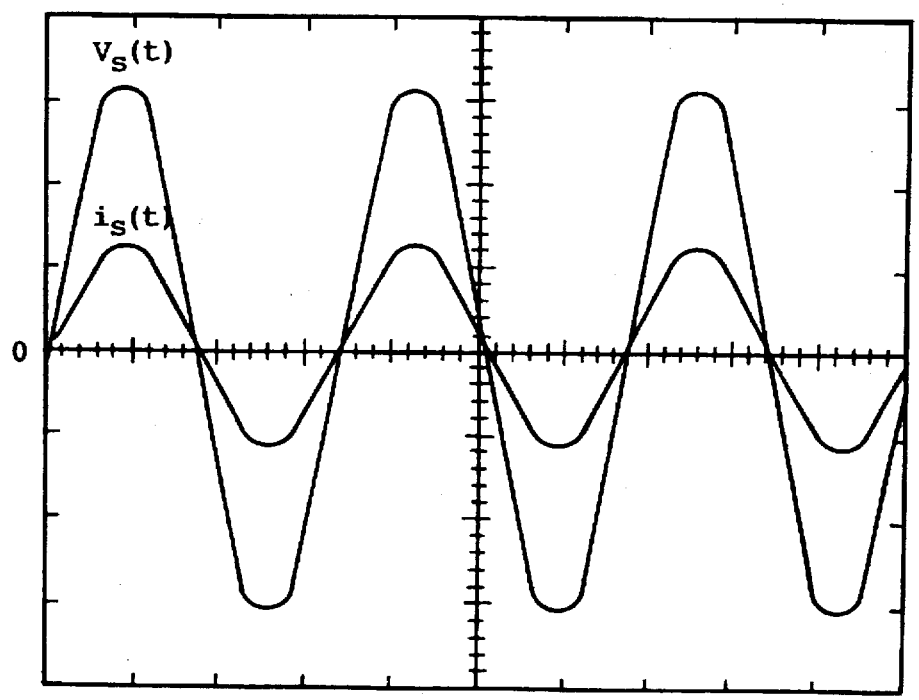
FIG. 4 is a diagram of experimental waveforms for input line voltage and current.
Figure 3A:
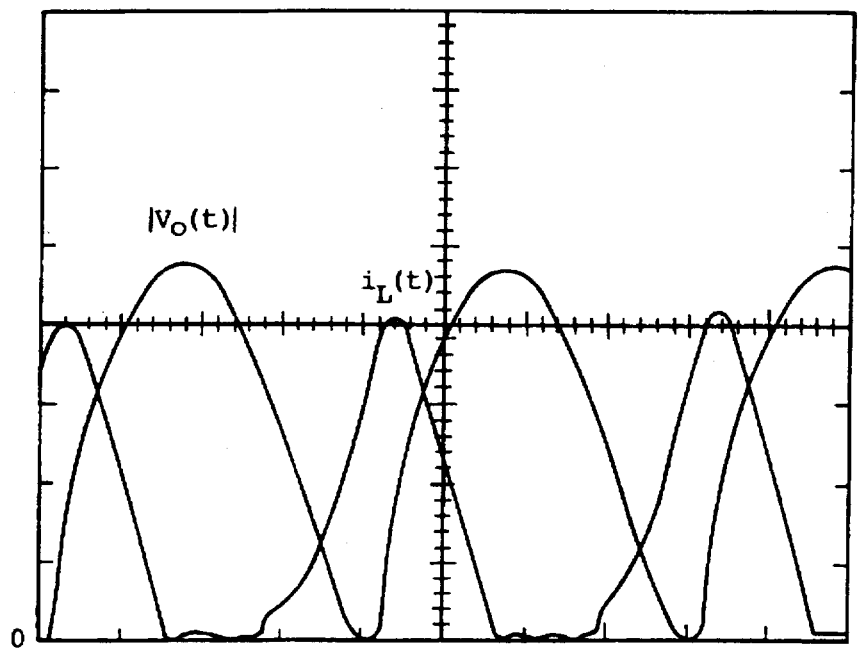
FIGS. 3(a)–3(b) are measured waveform diagrams of the current and voltage in cases of (a) $w_s t=\pi/8$ (b) $w_s t=\pi/2$.
Figure 3B:
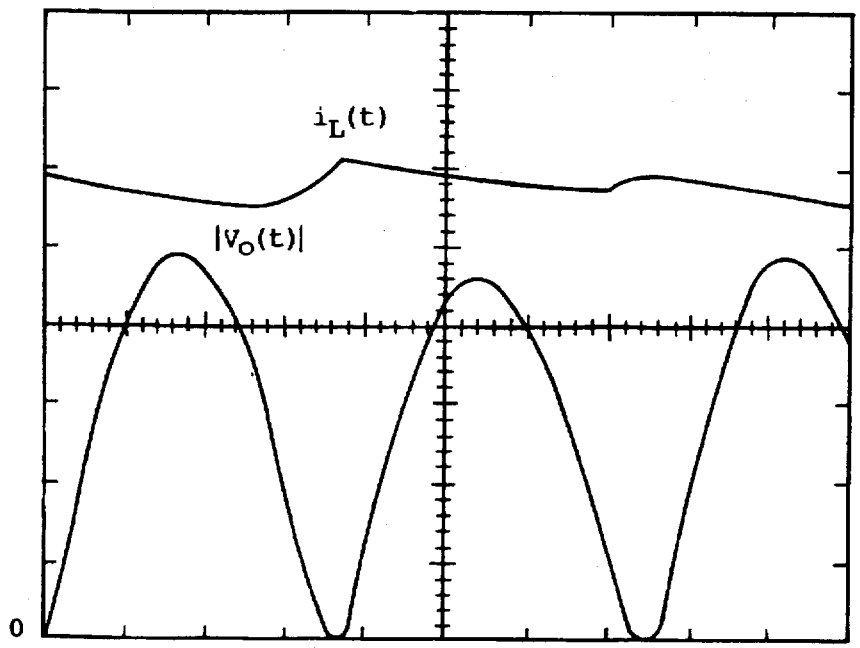

FIGS. 3(a)–3(b) show the measured high frequency waveforms. FIG. 4 shows the measured line current. The high frequency components have been removed by a small capacitor at the input terminal. As might be expected, this new design can achieve a high power factor greater than 0.99 and a low total harmonic distortion of less than 8%.

The preferred embodiment of a power factor correction circuit for an electronic ballast is suitable for the implementation in a circuit having specified input and output conditions. By selecting appropriate parameters, the preferred circuit can be made to perform input current shaping functions yielding high power factor and low harmonic distortion. The filtering function involves virtually no loss since the added circuit consists only of reactive components and soft switching diodes. Without additional active power switches and sophisticated control circuitry, the proposed filter is certainly cost-effective and does not decrease the overal efficiency of the electronic ballast.

We claim:

1. A dynamic filter for an electronic ballast including a rectifier and an inverter stage having DC inputs to which a DC voltage is supplied and high frequency outputs for outputting a high frequency output voltage, comprising:

a pair of high frequency energy tanks, each including an inductor and a capacitor; and a pair of energy transfer diodes connected between the high frequency energy tanks and DC inputs of the inverter stage, wherein said energy tanks are interposed between the rectifier and the energy transfer diodes and connected to the high frequency outputs of the inverter stage to cause the energy transfer diodes to switch on and off automatically at the inverter frequency, the high-frequency current in the inductors being drawn by the inverter output voltage, said dynamic filter thereby serving as a means for yielding a desired power factor correction and harmonic reduction by performing waveform shaping of an output of the rectifier which is supplied to the DC inputs of the inverter stage.

* * * * *